July 23, 1968     J. P. MALONEY     3,394,212
METHOD OF FORMING A MOLDED CLEVIS
Filed Aug. 12, 1965
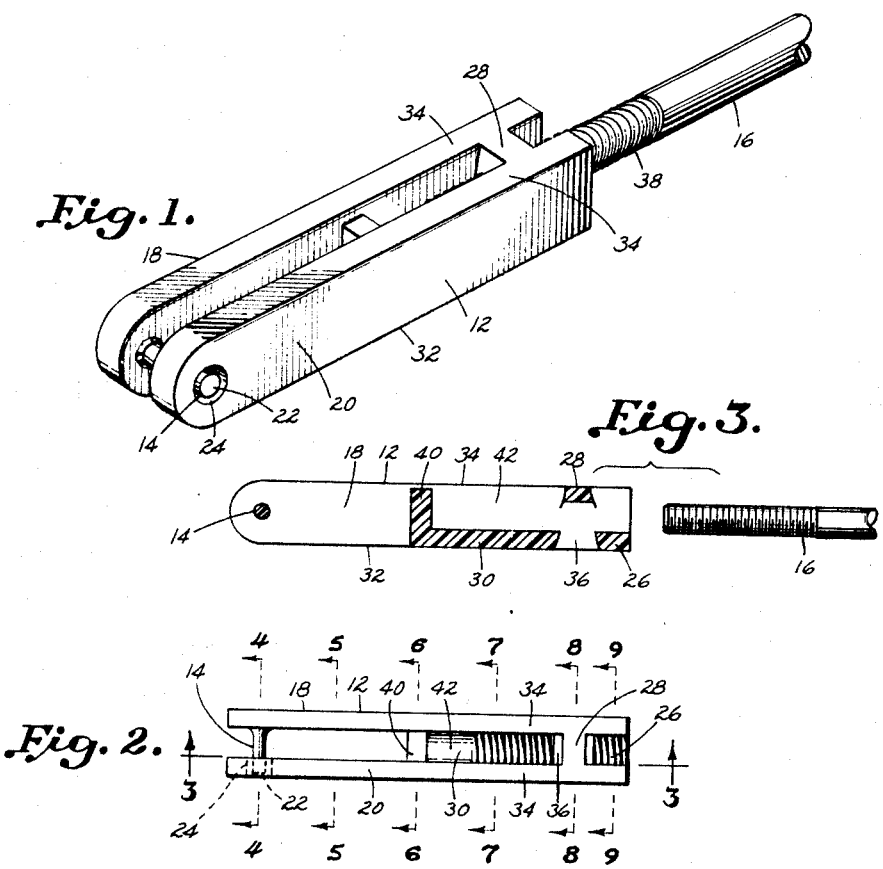
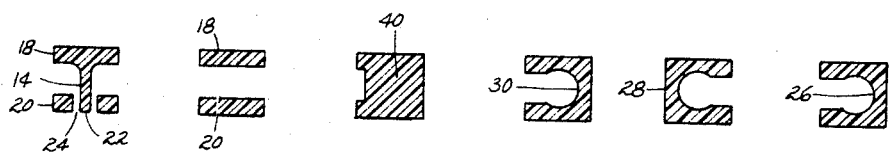
Fig. 4   Fig. 5   Fig. 6   Fig. 7   Fig. 8   Fig. 9
Inventor
JOHN P. MALONEY United States Patent Office 3,394,212
Patented July 23, 1968

3,394,212
METHOD OF FORMING A MOLDED CLEVIS
John P. Maloney, Cincinnati, Ohio, assignor to World Engines, Inc., Cincinnati, Ohio, a corporation of Ohio
Filed Aug. 12, 1965, Ser. No. 479,159
4 Claims. (Cl. 264—154)

ABSTRACT OF THE DISCLOSURE

A process for forming a plastic link or clevis comprises molding a one-piece body having a forward end composed of spaced parallel arms whose corresponding end portions are rigidly connected by a transverse molded pin integral with both end portions. A tubular milling cutter is then driven into the material of one arm with the axis of the cutter coinciding with the axis of the pin wherein the cutter is advanced through the thickness of the arm to provide an aperture in the arm and separate the pin from the arm.

The present invention relates to a molded plastic link or clevis which, in general, is adapted for light service in a mechanical control linkage or similar application. By way of example, the device of the invention may be used as part of the linkage employed in controlling the various maneuvers of miniature or model aeroplanes and the like, which may be controlled in flight from the ground by radio waves or otherwise. An engine-powered model aircraft ordinarily will require the use of several links or clevises, to control individually the engine throttle, wing flaps, rudder, elevator planes, and other movable parts which determine the flight pattern.

The links or clevises for the purposes stated above are quite small, and due to the small size thereof, difficulties are encountered in fabricating them economically without sacrificing the perfection and durability needed for safety and reliability of performance. A typical link or clevis may approximate one inch in length, and should be adapted for easy attachment to a rigid rod or a flexible cable, as may be required. The rigid rod mentioned may be the threaded end portion of a bicycle wheel spoke, or a stiff wire having a screw-threaded end to engage the link or clevis.

An object of the invention is to provide an improved link or clevis of molded plastic, which may be manufactured more economically and more simply, than a similar device constructed of metal.

Another object of the invention is to provide a device of the character stated, which in a model aircraft installation, eliminates undesirable interference with the radio control apparatus of the aircraft.

Another object is to provide a device of the character stated, which may be plastic molded with great rapidity, utilizing the simplest and most inexpensive type of mold having no retracting or unscrewing core pins, or other delicate parts to interfere with economical rapid production.

A further object of the invention is to provide a simple plastic clevis or link body which, without alteration, may be quickly and easily applied to the threaded end of a rod, or alternatively to a solderable end of a wire cable, as circumstances of use may require.

Another object of the invention is to provide a novel method and means for forming the cross pin of the molded plastic link or clevis, without resort to molds of an expensive, complex character.

The foregoing and other objects are attained by the means described herein and illustrated upon the accompanying drawing, in which:

FIG. 1 is a perspective view of the improved link or clevis, shown applied to the threaded end of a bicycle wheel spoke used as a control element.

FIG. 2 is a top plan view of the link or clevis, the control element being omitted.

FIG. 3 is a cross-sectional view taken on line 3—3 of FIG. 2, and showing a control element in broken lines.

FIGS. 4, 5, 6, 7, 8 and 9, are transverse cross-sections taken on the correspondingly numbered section lines of FIG. 2.

In the drawing, the reference numeral 12 indicates generally the one-piece elongate body of the improved link or clevis, formed wholly of a molded plastic material, for example Delron, Nylon, or equivalent moldable substance. At one end of the body is formed, as an integral part, the cross pin 14 which in effect is a hitch to engage a so-called control horn or perforated lug to be actuated correspondingly with longitudinal reciprocation of body 12. The opposite end of body 12 is adapted for attachment to a control element 16, which FIG. 1 depicts as the threaded end of a standard bicycle wheel spoke, or similar rod. Element 16 might, if required, be a twisted or braided wire rope or cable, to be anchored relative to body 12 by one or more beads of solder applied to the rope or cable, as will be explained.

Body 12 may be cast in a simple mold having no retractable or removable core parts. When the body is ejected from the mold, opposite ends of cross pin 14 will be found integral with the spaced parallel arms 18 and 20 of the body. In the finished device, however, cross pin 14 is to have a free end 22 separated from arm 20, by a surrounding aperture 24 through which the pin may move axially as arms 18 and 20 are flexed toward and from one another.

To provide for the independency of pin 14 from arm 20, a tubular or sleeve type milling cutter may be rotated endwise against the outside of arm 20, with the axis of the cutter coinciding with the axis of pin 14. As the cutter advances through the thickness of arm 20, it will produce the aperture 24 and shape the free end portion 22 of the pin. If desired, the cutter may be advanced along the full length of pin 14, to impose a final diametral dimension of the pin from end to end. The pin, as will be understood, remains integral with arm 18 but separated from arm 20.

It is possible, of course, to provide a complex mold having removable or retractable core parts whereby body 12 may emerge in finished condition, that is, with pin 14 unattached to arm 20. However, the finishing by means of the tubular milling cutter is a preferred method and practice; but the invention is not necessarily limited to this preference.

Referring to FIGS. 1 and 2, it will be noted that arms 18 and 20, being of inherently flexible and resilient molded plastic, can be flexed in opposite directions to displace the end 22 of cross pin 14 wholly from aperture 24. When so displaced, the cross pin is exposed for operative connection with a perforated lug, control horn, anchor ring or other apparatus to be manipulated by reciprocating the link or clevis axially. The arms 18 and 20 normally resume a position of substantial parallelism one with the other, as shown.

The mold for body 12 is so constructed as to form with the parallel arms 18 and 20, a plurality of integral spacer struts such as 26, 28, 30. Struts 26 and 30 span the lower edges 32 of arms 18 and 20, and are disposed preferably in a common plane. Strut 28 spans the upper edges 34 of arms 18 and 20, and rests in a plane which is spaced from the plane of struts 30 and 26. Struts 30 and 26 preferably have a gap 36 between them, arched over by transverse strut 28. The length of the gap, in the direction of the major axis of body 12, exceeds somewhat the length of strut 28, by preference, to facilitate driving of control element 16 into the butt end of the link or clevis, FIG. 3.

As was previously pointed out, element 16 might be a bicycle wheel spoke having a threaded end 38, FIG. 1, to be advanced from the butt end of the link forwardly toward cross pin 14, by rotating the link onto the threaded end of element 16, causing the element to cut its own threads into the material of struts 26, 28, 30. As an alternative, of course, the lands of the struts may be tapped in advance of inserting the element 16, if desired, but would involve an added tapping operation.

In order to obtain a maximal secure connection between element 16 and body 12, the space between legs 18 and 20 in the region of struts 26, 28, 30, should be slightly less than the diameter of element 16; and likewise, the height of strut 28 above struts 30 and 26, should be slightly less than the diameter of element 16. Observance of these dimensional limitations assures not only a connection which is secure, but adjustable also. That is, body 12 can be adjusted both rotationally of, and lengthwise of, the major axis of element 16.

The forward portion of strut 30 may include an upstanding transverse wall 40 which, being molded, is integral with strut 30 and the arms 18 and 20 of the link body. Wall 40 may constitute a stop to limit advancement of control element 16 axially through the body, and may also reinforce the arms 18 and 20 where the area of flexation is greatest, that is, about midway between the ends of the link body. Wall 40 spans the legs 18 and 20, and the mean plane of the wall is perpendicular to both legs and to the major axis of body 12, by preference.

It is desirable also that wall 40 traverse substantially the full width of each leg, between the edges 32 and 34, so as to form a pocket 42 bounded by wall 40, strut 30, and strut 28.

If in FIG. 3 it be assumed that element 16 is a braided or twisted flexible wire cable, the end of the cable may be advanced to the left until it is topped by wall 40. The cable then will rest within pocket 42, overlying both struts 30 and 26. A bead of molten solder may be then dropped onto the cable within pocket 42, for anchoring the cable to the link or clevis. Additional solder may be applied to the cable, if desired, through gap 36, and at the right of strut 28, to obtain reinforced anchorage when necessary.

The moldable plastic material Delron has proven highly satisfactory for the molding of links or clevises of the type herein disclosed. The link or clevis body is released from the mold with ease, due to contour advantages characterizing the simple design thereof, including the stepped or staggered relationship of the several struts 26, 28, 30. In the preferred procedure, cross pin 14 is fashioned by means of the hollow milling cutter as previously explained.

The assembling according to FIG. 1, the threaded end of the control element 16 may be rotated into position embraced by struts 26, 28, 30, to effect a threaded connection which is adjustable as to length. The threaded end of element 16 may be utilized to self-tap its way into the link body; or alternatively, a tapping tool may be used for forming threads in the struts beforehand, to accommodate the threaded end of the control element.

The link or clevis formed of plastic as herein disclosed, presents practical advantages of merit over the known devices usually formed of metal. The plastic device creates a minimum of RF noise in any model aircraft installation, thereby avoiding RF noise feed-back into radio receivers which often is responsible for false signals causing crashes. The plastic device, moreover, is less expensive than comparative metallic devices, and is more dependable and durable.

It is to be understood that various modifications and changes may be made in the structural details of the device of this invention, within the scope of the appended claims, without departing from the spirit of the invention.

What I claim is:

1. The method of forming a plastic link or clevis having a hitch, said method comprising: molding a one-piece elongate body having a butt end, and a forward end constituted of a pair of spaced parallel arms having corresponding end portions rigidly connected by a transverse molded pin integral with both end portions; driving into the material of one arm a tubular milling cutter axially aligned with the pin, to remove material from said one arm for shaping an extension of the pin and providing an aperture in said one arm surrounding the pin.

2. The method of forming a plastic link or clevis having a hitch, said method comprising: molding a one-piece elongate body having a butt end including a plurality of off-set struts receptive of a control element; and a forward end constituted of a pair of spaced parallel arms having corresponding end portions rigidly connected by a transverse molded pin integral with both end portions; cutting from the material of one arm a circular recess, leaving a cylindrical concentric core within the recess integral and coaxial with the molded pin and of approximately the same diameter, the depth of the recess being equal to the thickness of said one arm, and separating said one arm from the core and the pin, whereby said one arm may be flexed in the direction of the pin axis within the limits of flexibility of the plastic material constituting said arm.

3. The method of forming a plastic link or clevis having a hitch, said method comprising: molding a one-piece elongate body having a butt end, and a forward end constituted of a pair of spaced parallel arms having corresponding end portions integrated by a transverse molded pin; cutting from the material of one arm a circular recess, leaving a cylindrical concentric core within the recess integral and coaxial with the molded pin, the depth of the recess being equal to the thickness of said one arm, and separating said one arm from the core and the pin, whereby said one arm may be flexed in the direction of the pin axis, within the limit of inherent flexibility of said arm.

4. The method according to claim 3, wherein formation of the circular recess is performed by a tubular milling cutter the inside diameter of which approximates the diameter of the transverse molded pin aforesaid.

References Cited

UNITED STATES PATENTS

| | | | |
|---|---|---|---|
| 1,023,002 | 4/1912 | Bennett | 77—69 |
| 3,039,183 | 6/1962 | Laster | 29—416 |
| 3,180,018 | 4/1965 | Hougen | 77—69 X |

ROBERT F. WHITE, *Primary Examiner.*

S. I. LANDSMAN, *Assistant Examiner.*